US012561744B2

(12) United States Patent
Caputo et al.

(10) Patent No.: US 12,561,744 B2
(45) Date of Patent: *Feb. 24, 2026

(54) DIFFERENTIAL EVOLUTION ALGORITHM TO ALLOCATE RESOURCES

(71) Applicant: Hartford Fire Insurance Company, Hartford, CT (US)

(72) Inventors: Edward C. Caputo, Canton, CT (US); Garrett M. MacDonald, Farmington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/812,281

(22) Filed: Aug. 22, 2024

(65) Prior Publication Data

US 2024/0412291 A1     Dec. 12, 2024

Related U.S. Application Data

(63) Continuation of application No. 17/982,003, filed on Nov. 7, 2022, now Pat. No. 12,094,001, which is a continuation of application No. 17/332,192, filed on May 27, 2021, now Pat. No. 11,521,267.

(51) Int. Cl.
| | |
|---|---|
| *G06Q 40/04* | (2012.01) |
| *G06Q 40/03* | (2023.01) |
| *G06Q 40/06* | (2012.01) |

(52) U.S. Cl.
CPC ............. *G06Q 40/04* (2013.01); *G06Q 40/03* (2023.01); *G06Q 40/06* (2013.01); *G06Q 40/062* (2025.08)

(58) Field of Classification Search
CPC ......... G06Q 40/04; G06Q 40/03; G06Q 40/06
See application file for complete search history.

(56) References Cited

U.S. PATENT DOCUMENTS

| | | | | |
|---|---|---|---|---|
| 7,822,668 B1 * | 10/2010 | Benda | .................... | G06Q 40/06 705/36 R |
| 2016/0019647 A1 * | 1/2016 | Hofmann | ............... | G06Q 40/06 705/36 R |

* cited by examiner

*Primary Examiner* — Bennett M Sigmond
*Assistant Examiner* — Marla Hudson
(74) *Attorney, Agent, or Firm* — Buckley, Maschoff & Talwalkar LLC

(57) ABSTRACT

Some embodiments are directed to a resource allocation analysis system implemented via a back-end application computer server. A resource data store may contain electronic records associated with a set of resource types, each electronic record including an electronic record identifier and resource parameter. The back-end application computer server may receive, from the resource data store, information about a set of resource types to be analyzed, including the associated resource parameters. The computer server may then execute a differential evolutionary algorithm to optimize the set of resource types based on at least one non-linear constraint and generate resource analysis results. The back-end application computer server may, according to some embodiments, perform a resampling process that uses non-parameterized historical data, regression on at least one resource type, and moment matching.

22 Claims, 17 Drawing Sheets

200

300

UNIVERSE OF INVESTABLE ASSET CLASSES

|  | Risk/Return | Income | Duration | Capital Charge | Tax Benefit |
|---|---|---|---|---|---|
| High Yield Corporate | 1 | 1 | 3 | 1 | |
| Emerging Markets | 2 | 2 | | 2 | |
| Tax-Exempt Municipals | 3 | 2 | 1 | 3 | 1 |
| Private Equity | 1 | 1 | | 1 | |
| Hedge Funds | 2 | 2 | | 1 | |
| Public Equity | 1 | 1 | | 1 | 2 |
| U.S. Treasuries | 3 | 3 | 4 | 3 | |
| Cash | 3 | 3 | 3 | 3 | |

| High | 1 |
|---|---|
| Mid | 2 |
| Low | 3 |
| Varies | 4 |

400

MEAN-VARIANCE OPTIMIZATION    410

RISK/
VARIANCE

LINEAR
CONSTRAINTS

QUADRADIC
ALGORITHM 420

OPTIMAL
SOLUTION

Figure 8A:
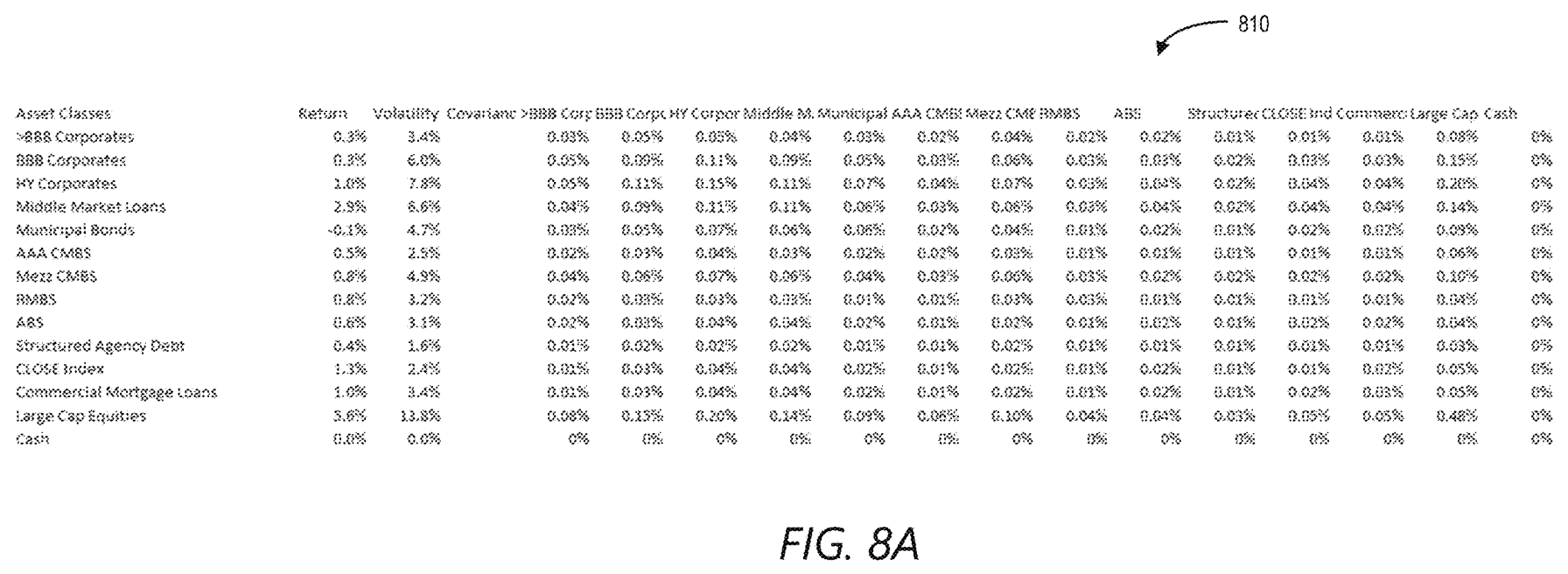

810

| Asset Classes | Return | Volatility | Covariance >BBBB Corp | BBB Corp | HY Corpor | Middle M | Municipal | AAA CMBS | Mezz CMBS | RMBS | ABS | Structurer | CLOSE Ind | Commerc | Large Cap | Cash |
|---|---|---|---|---|---|---|---|---|---|---|---|---|---|---|---|---|
| >BBBB Corporates | 0.3% | 3.4% | 0.03% | 0.05% | 0.05% | 0.04% | 0.03% | 0.02% | 0.04% | 0.02% | 0.02% | 0.03% | 0.01% | 0.03% | 0.06% | 6% |
| BBB Corporates | 0.8% | 6.0% | 0.05% | 0.09% | 0.11% | 0.09% | 0.05% | 0.03% | 0.06% | 0.03% | 0.05% | 0.02% | 0.03% | 0.03% | 0.15% | 6% |
| HY Corporates | 1.0% | 7.8% | 0.05% | 0.11% | 0.15% | 0.11% | 0.07% | 0.04% | 0.07% | 0.03% | 0.05% | 0.02% | 0.04% | 0.04% | 0.20% | 6% |
| Middle Market Loans | 2.9% | 6.6% | 0.04% | 0.09% | 0.11% | 0.11% | 0.06% | 0.03% | 0.08% | 0.03% | 0.04% | 0.02% | 0.04% | 0.04% | 0.14% | 6% |
| Municipal Bonds | -0.1% | 4.7% | 0.03% | 0.05% | 0.07% | 0.06% | 0.06% | 0.02% | 0.04% | 0.03% | 0.02% | 0.01% | 0.02% | 0.02% | 0.09% | 6% |
| AAA CMBS | 0.5% | 2.5% | 0.02% | 0.03% | 0.04% | 0.03% | 0.02% | 0.03% | 0.05% | 0.03% | 0.01% | 0.03% | 0.01% | 0.02% | 0.06% | 6% |
| Mezz CMBS | 0.6% | 4.9% | 0.04% | 0.06% | 0.07% | 0.06% | 0.04% | 0.03% | 0.06% | 0.03% | 0.02% | 0.01% | 0.02% | 0.02% | 0.10% | 6% |
| RMBS | 0.6% | 3.2% | 0.02% | 0.05% | 0.03% | 0.03% | 0.01% | 0.01% | 0.03% | 0.03% | 0.01% | 0.01% | 0.01% | 0.01% | 0.04% | 6% |
| ABS | 0.6% | 3.1% | 0.02% | 0.03% | 0.04% | 0.04% | 0.02% | 0.01% | 0.02% | 0.04% | 0.02% | 0.03% | 0.02% | 0.02% | 0.04% | 6% |
| Structured Agency Debt | 0.4% | 1.6% | 0.01% | 0.02% | 0.02% | 0.02% | 0.01% | 0.01% | 0.02% | 0.01% | 0.01% | 0.01% | 0.03% | 0.03% | 0.03% | 6% |
| CLOSE Index | 1.3% | 2.4% | 0.01% | 0.03% | 0.04% | 0.04% | 0.02% | 0.01% | 0.02% | 0.01% | 0.02% | 0.01% | 0.03% | 0.02% | 0.05% | 6% |
| Commercial Mortgage Loans | 1.0% | 3.4% | 0.01% | 0.03% | 0.04% | 0.04% | 0.02% | 0.01% | 0.02% | 0.01% | 0.02% | 0.02% | 0.02% | 0.03% | 0.05% | 6% |
| Large Cap Equities | 3.6% | 13.8% | 0.08% | 0.15% | 0.25% | 0.21% | 0.09% | 0.06% | 0.10% | 0.04% | 0.04% | 0.04% | 0.05% | 0.05% | 0.40% | 6% |
| Cash | 0.0% | 0.0% | 0% | 0% | 0% | 0% | 0% | 0% | 0% | 0% | 0% | 0% | 0% | 0% | 6% | 6% |

| PORTFOLIO ID 1102 | ASSET CLASS 1104 | RISK/ RETURN 1106 | INCOME 1108 | TAX BENEFIT 1110 |
|---|---|---|---|---|
| P_111 | HIGH YIELD CORPORATE | 1 | 1 | |
| P_111 | EMERGING MARKETS | 2 | 2 | |
| P_111 | TAX-EXEMPT MUNICIPALS | 3 | 2 | 1 |
| P_112 | PRIVATE EQUITY | 1 | 1 | |

DIFFERENTIAL EVOLUTION ALGORITHM TO ALLOCATE RESOURCES

CROSS-REFERENCE TO RELATED APPLICATIONS

The present application is a continuation of U.S. patent application Ser. No. 17/982,003 entitled "DIFFERENTIAL EVOLUTION ALGORITHM TO ALLOCATE RESOURCES" and filed Nov. 27, 2022, which was a continuation of U.S. patent application Ser. No. 17/332,192 entitled "DIFFERENTIAL EVOLUTION ALGORITHM TO ALLOCATE RESOURCES" and filed on May 27, 2021. The entire contents of those applications are incorporated herein by reference.

TECHNICAL FIELD

The present application generally relates to computer systems and more particularly to computer systems that are adapted to accurately and/or automatically analyze resource allocations.

BACKGROUND

An enterprise may want to analyze a set of resource types. For example, an insurer might want to analyze a portfolio of assets, such as stocks, bonds, hedge fund assets, etc. In particular, the enterprise might want to optimize an allocation of resources to improve a particular result (e.g., improve net investment income) while satisfying or more constraints (e.g., a portfolio duration). When the constraints are linear, a mean-variance optimization with a quadradic algorithm is typically performed to achieve such a result. In some cases, however, one or more constraints may be non-linear (e.g., a book yield), in which case a quadradic algorithm cannot be used.

It would be desirable to provide improved systems and methods to accurately and/or automatically analyze resource allocations. Moreover, the results should be easy to access, understand, interpret, update, etc.

SUMMARY OF THE INVENTION

According to some embodiments, systems, methods, apparatus, computer program code and means are provided to accurately and/or automatically analyze resource allocations in a way that provides fast and useful results and that allows for flexibility and effectiveness when responding to those results.

Some embodiments are directed to a resource allocation analysis system implemented via a back-end application computer server. A resource data store may contain electronic records associated with a set of resource types, each electronic record including an electronic record identifier and resource parameter. The back-end application computer server may receive, from the resource data store, information about a set of resource types to be analyzed, including the associated resource parameters. The computer server may then execute a differential evolutionary algorithm to optimize the set of resource types based on at least one non-linear constraint and generate resource analysis results. The back-end application computer server may, according to some embodiments, perform a resampling process that uses non-parameterized historical data, regression on at least one resource type, and moment matching.

Some embodiments comprise: means for receiving, by the back-end application computer server from a resource data store, information about a set of resource types to be analyzed, including associated resource parameters, wherein the resource data store contains electronic records associated with a set of resource types, each electronic record including an electronic record identifier and resource parameter; and means for executing a differential evolutionary algorithm to optimize the set of resource types based on at least one non-linear constraint and generate resource analysis results. The back-end application computer server performs a resampling process that uses non-parameterized historical data, regression on at least one resource type, and moment matching.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to accurately and/or automatically evaluate resource allocations in a way that provides fast and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 8A through 8F provide an example of how resampling can improve results in accordance with some embodiments.

FIG. 11 is a portion of a tabular asset portfolio data store according to some embodiments.

DETAILED DESCRIPTION

Figure 1:
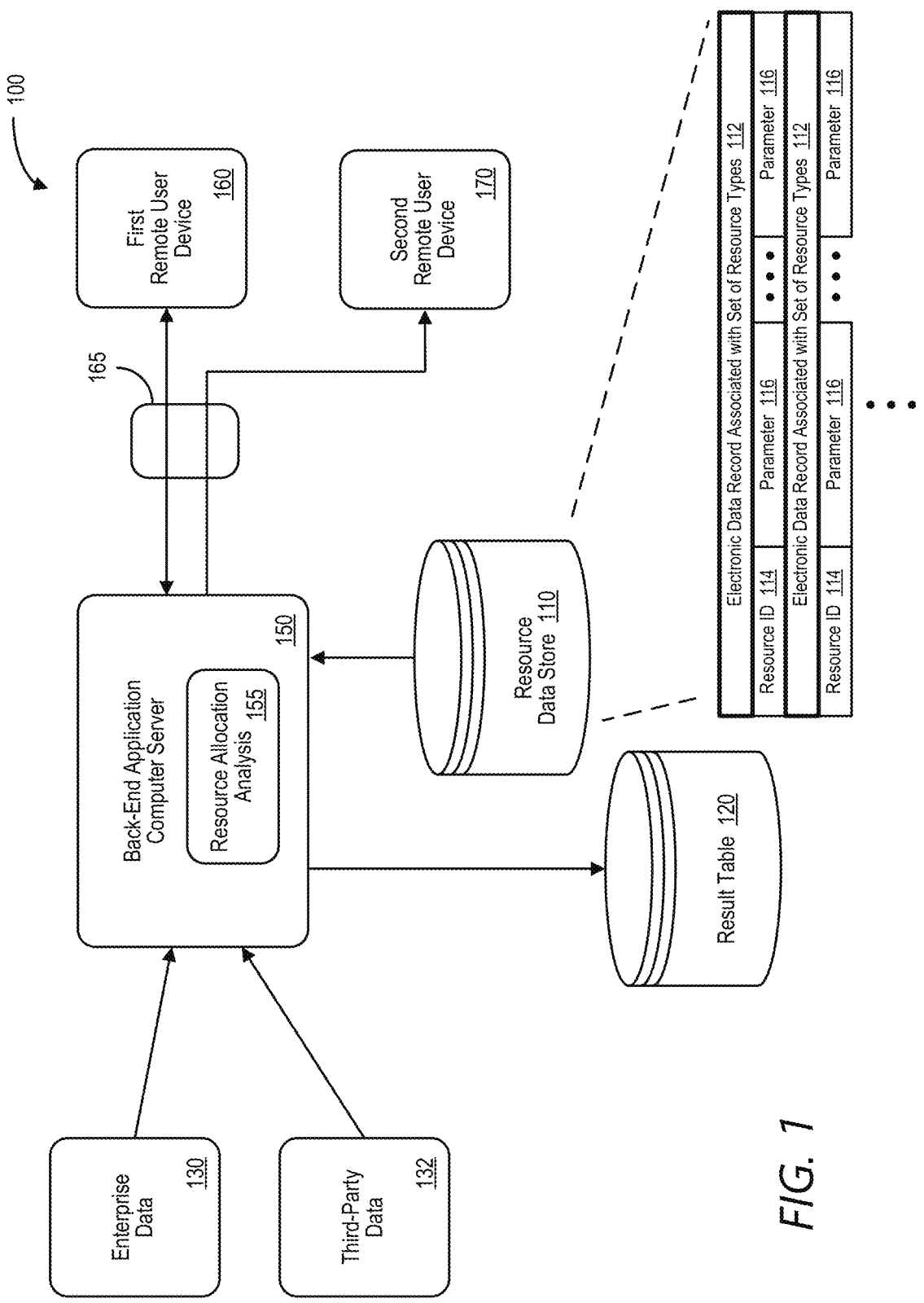
FIG. 1 is a high-level block diagram of a resource allocation analysis system in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data analytics associated with resource allocation analysis. The present invention is directed to more than merely a computer implementation of a routine or conventional activity previously known in the industry as it provides a specific advancement in the area of electronic record analysis by providing improvements in the operation of a computer system that analyzes resource allocations. The present invention provides improvement beyond a mere generic computer implementation as it involves the novel ordered combination of system elements and processes to provide improvements in the speed and accuracy of such an analysis. Some embodiments of the present invention are directed to a system adapted to automatically analyze electronic records, aggregate data from multiple sources, automatically optimize resource allocations, etc. Moreover, communication links and messages may be automatically established, aggregated, formatted, exchanged, etc. to improve network performance (e.g., by reducing an amount of network messaging bandwidth and/or storage required to analyze resource allocations).

FIG. 1 is a high-level block diagram of a resource allocation analysis system 100 according to some embodiments of the present invention. In particular, the system 100 includes a back-end application computer server 150 that may access information in a resource data store 110 (e.g., storing a set of electronic records associated with an enterprise 112, each record including, for example, one or more resource identifiers 114, parameters 116, etc.). The back-end application computer server 150 may also store information into other data stores, such as a result table 120 and utilize a resource allocation analysis system 155 to view, analyze, and/or update the electronic records. The back-end application computer server 150 may also exchange information with a first remote user device 160 and a second remote user device 170 (e.g., via a firewall 165). According to some embodiments, an interactive graphical user interface platform of the back-end application computer server 150 (and, in some cases, enterprise data 130 and/or third-party data 132) may facilitate forecasts, decisions, predictions, and/or the display of results via one or more remote administrator computers (e.g., to identify an optimized resource allocation) and/or the remote user devices 160, 170. For example, the first remote user device 160 may transmit annotated and/or updated information to the back-end application computer server 150. Based on the updated information, the back-end application computer server 150 may adjust data in the resource data store 110 and/or the result table 120 and the change may be viewable via the second remote user device 170. Note that the back-end application computer server 150 and/or any of the other devices and methods described herein might be associated with a third party, such as a vendor that performs a service for an enterprise.

The back-end application computer server 150 and/or other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records in the result table 120. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the resource data store 110 and/or the result table 120. The data elements 110, 120 may be locally stored or reside remote from the back-end application computer server 150. As will be described further below, the resource data store 110 may be used by the back-end application computer server 150 in connection with an interactive user interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and resource data store 110 might be co-located and/or may comprise a single apparatus.

Figure 2:
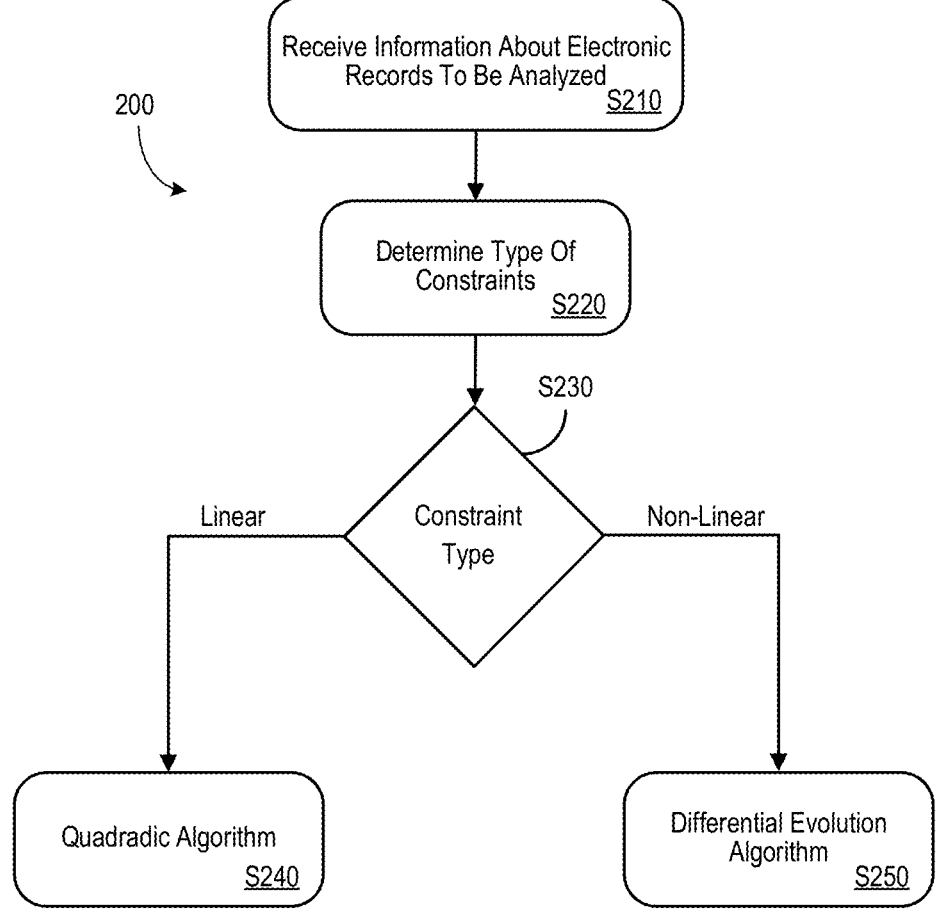
FIG. 2 illustrates a resource allocation analysis method according to some embodiments of the present invention.

Note that the system 100 of FIG. 1 is provided only as an example, and embodiments may be associated with additional elements or components. According to some embodiments, the elements of the system 100 automatically transmit information associated with an interactive user interface display over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may receive, from a resource data store, information about a set of resource types to be analyzed, including associated resource parameters. The resource data store may, according to some embodiments, contain electronic records associated with a set of resource types (e.g., a portfolio of assets owned by an insurer), and each electronic record may include an electronic record identifier and resource parameter. The system may then determine constraints associated with optimization of the portfolio at S220. The portfolio might include, for example, stocks, bonds, hedge fund assets, high yield corporate assets, emerging market assets, tax-exempt municipal assets, private equity, governmental treasury assets, cash, etc. If the constraints are linear at S230, the system may use a quadradic equation to perform the optimization at S240.

If the constraints are non-linear at S230, the system may use a differential evolution algorithm to perform the optimization at S250. Examples of non-linear constraints might include, according to some embodiments, capital consumption, asset turnover, book yield, realized capital gains, etc. According to some embodiments, the differential evolution algorithm might optimize Net Investment Income ("NII") and/or expected return (e.g., the system might maximize the expected return while keeping the NII at the same level). In particular, the system may execute the differential evolutionary algorithm to optimize the set of resource types based on at least one non-linear constraint and generate resource analysis results. As used herein, the phrase "evolutionary algorithm" may refer to a generic model-based metaheuristic optimization algorithm. The algorithm may use mechanisms inspired by biological evolution, such as reproduction, mutation, recombination, and selection. Candidate solutions to the optimization problem play the role of individual models in a population, and a fitness function determines the quality of the solutions (e.g., as defined by a target loss function). Evolution of the models then takes place after the repeated application of these operators. Note that evolutionary algorithms often perform well approximating solutions to various types of problems because they ideally do not make any assumption about the underlying fitness landscape. In many applications, computational complexity of the evolutionary algorithm is a prohibiting factor. Consider, for example, a generic single-objective evolutionary algorithm. The system may initially generate an initial population of models randomly (e.g., the first generation). The system may then repeat the following re-generational steps until termination: (1) evaluate the fitness of each model in the population, (2) select the fittest models for reproduction (parents), (3) create new models through crossover and mutation operations to give birth to offspring models, and (4) replace the least-fit models in the population with new models.

According to some embodiments, a back-end application computer server performs a resampling process that uses non-parameterized historical data, regression on at least one resource type, and moment matching. The resampling process might comprise, for example: constructing a risk-return curve using mean-variance optimization; executing resamples with varied return distribution or confidence intervals; and constructing a new risk-return curve by averaging the resampled results. As used herein, the phrase "moment matching" may refer to a determination of a mixture parameters such that the composite distribution has moments matching some given value. In many instances extraction of solutions to the moment equations may present non-trivial algebraic or computational problems. Moment matching might be associated with, for example, a mean, a volatility, a skew, a distribution shape, etc.

Portfolio construction in insurance asset management may be centrally focused on driving the business objectives of an insurance company, which generally include supporting earnings, allocating capital, and growing book value. Objectives and constraints may vary but can be broadly grouped into three categories: liability funding needs, accounting and regulatory constraints, and economic considerations. Because of this, portfolio optimization for insurance portfolios tends to be more complicated and incorporate more factors than traditional asset allocation models.

Portfolio optimization can account for liability funding needs in the form of duration, yield, and/or liquidity targets. Accounting and regulatory restrictions can be managed through limits on net investment income impact, expected write downs, and total capital consumption of solutions.

Economic considerations include investment performance and risk tolerance, absolute and relative to liabilities, in both normal and stressed environments.

A multitude of portfolio constraints can be incorporated into a model, which can help ensure appropriate levels of diversification, especially when using inputs that carry uncertainty. Typically, constraints include restrictions on the exposure to an asset class or group of asset classes (e.g., limits on illiquid assets). Constraints on duration, yield, capital, and stress capital may also be reflected in the model. Using reasonable assumptions for future investment performance, portfolios are generated that attempt to satisfy objectives without violating constraints.

Figure 3:
FIG. 3 is a universe of investible asset classes in accordance with some embodiments.

To generate a portfolio optimization, the system may start with a universe of investable asset classes. For example, FIG. 3 is a universe of investible asset classes 300 in accordance with some embodiments. Each asset class 300 includes parameters such as those for risk/return, income, duration, capital charge, tax benefit, etc. Expected returns may be determined using current market valuations combined with tactical views. Next, the system may evaluate expected for each asset class 300, including the shape of the expected return distribution and correlations with other asset classes 300.

Figure 4:
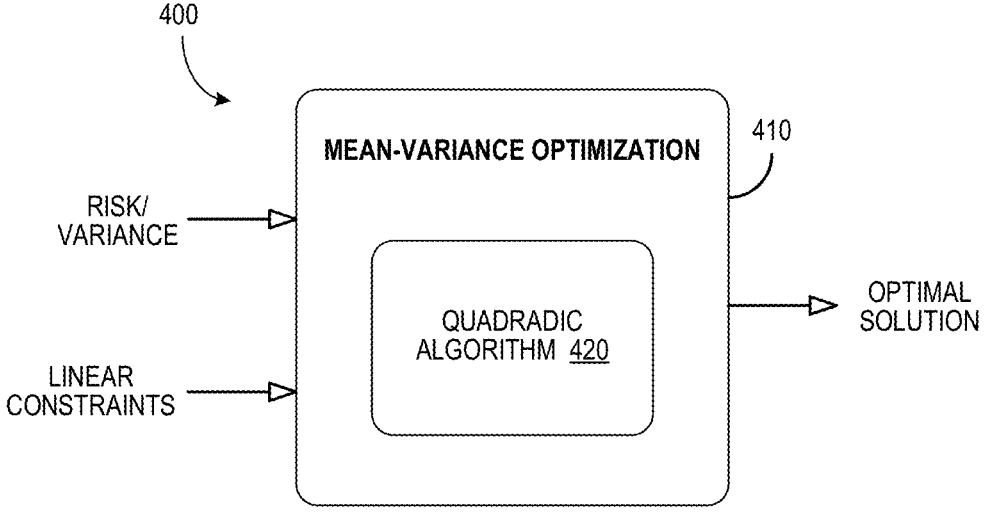
FIG. 4 is a mean-variance optimization system in accordance with some embodiments.

A mean-variance optimization is then modeled using all the accompanying data. FIG. 4 is a mean-variance optimization system 400 in accordance with some embodiments. A mean-variance optimization platform 410 with a quadradic algorithm 420 receives risk/variance along with linear constraints and generates an optimal solution. The mean-variance optimization platform 410 may maximize an expected return (the mean) given the portfolio's risk (the variance) and other constraints. Provided all constraints are linear (changes in market values lead to proportional changes in constraints), the quadratic algorithm 420 can be used to in the effort to find the optimal solution. Assumptions may include yield and duration profiles, expected credit losses and downgrades, tax treatment, capital charges and stress losses.

With respect to potential shortcomings of traditional optimization, traditional mean-variance optimization has been challenged by some in the industry for three primary reasons: the assumption of normality in returns, sensitivity to small changes in assumptions, and under-diversification of portfolio solutions. Investment returns, especially in credit instruments such as corporate bonds and structured products (typically a significant part of an insurance portfolio), have historically shown asymmetrical risk, or "long tails." Ignoring this by solely optimizing on the expected volatility of a portfolio may result in solutions that fail to sufficiently account for the true downside risk in stressed environments.

Model sensitivity is another potential drawback of traditional mean-variance optimization due to the uncertainty of expected returns. Even a small change in an input, especially a shift in performance, can cause a significant reallocation. This issue can become more severe as the number of asset classes increases.

Due to the model sensitivity issue, under-diversification can occur. For example, two potential asset classes (A and B) have similar characteristics, but the expected return for A is slightly higher than B. Traditional mean-variance optimization would meaningfully overweight A versus B. In reality, a diversified portfolio should hold similar allocations to these two asset classes. A minor change can even cause an asset class to drop out altogether or a new asset class to appear with a substantial weight.

An alternate approach to portfolio optimization is designed to produce intuitive and implementable solutions. The backbone of the approach is a process called resampling, which involves sampling multiple periods of returns from historical data (e.g., 3-year windows), generating an optimized portfolio, and repeating the exercise hundreds or even thousands of times. For instance, a resample of history could include multiple great recessions or any number of dotcom bubbles. Optimized portfolios may presented in the form of efficient frontiers or "curves," which include a minimum volatility portfolio, a maximum return portfolio, and several portfolios in between meant to maximize return at given levels of risk.

Figure 5:
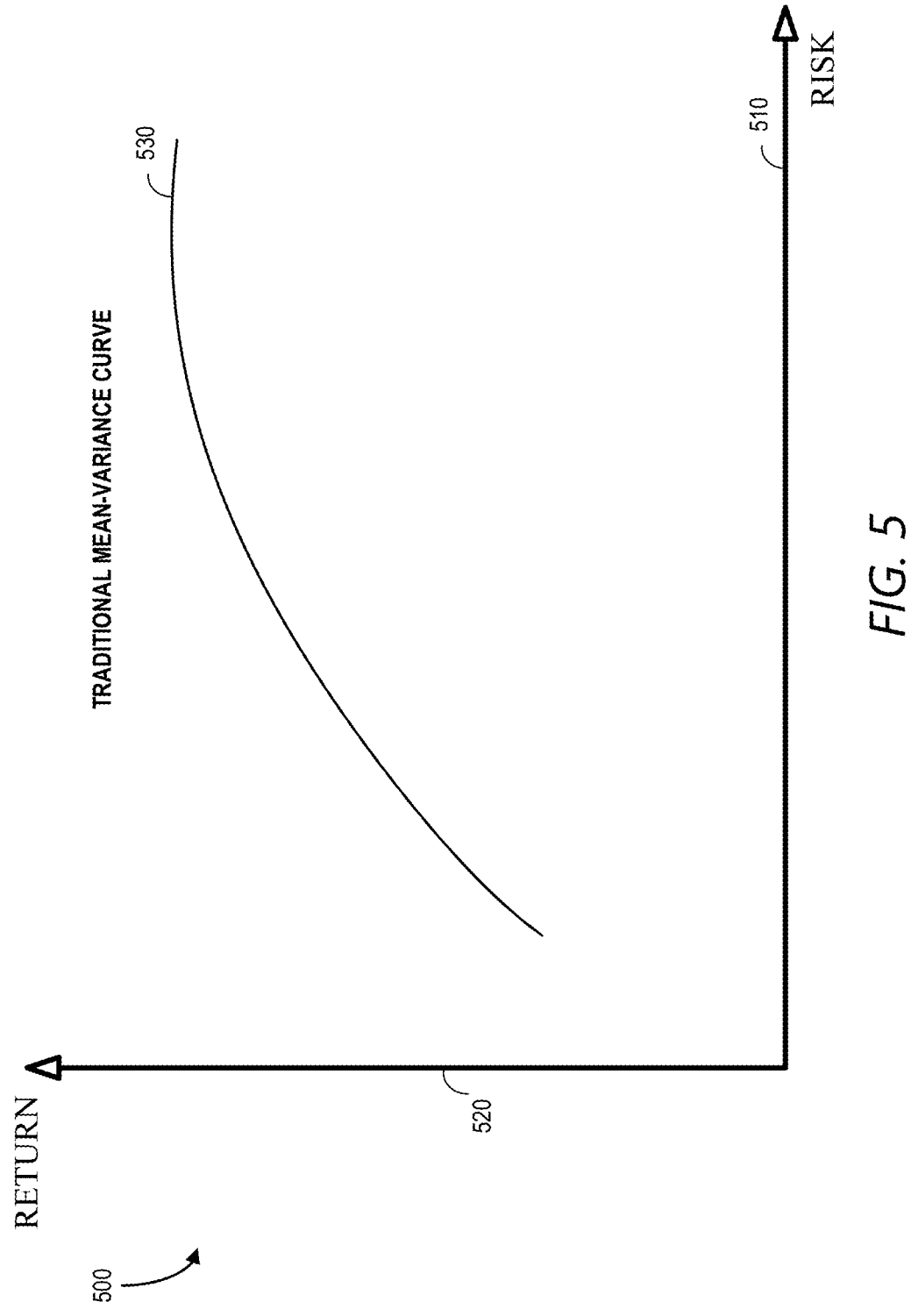
FIG. 5 shows a traditional mean-variance curve in accordance with some embodiments.
Figure 6:
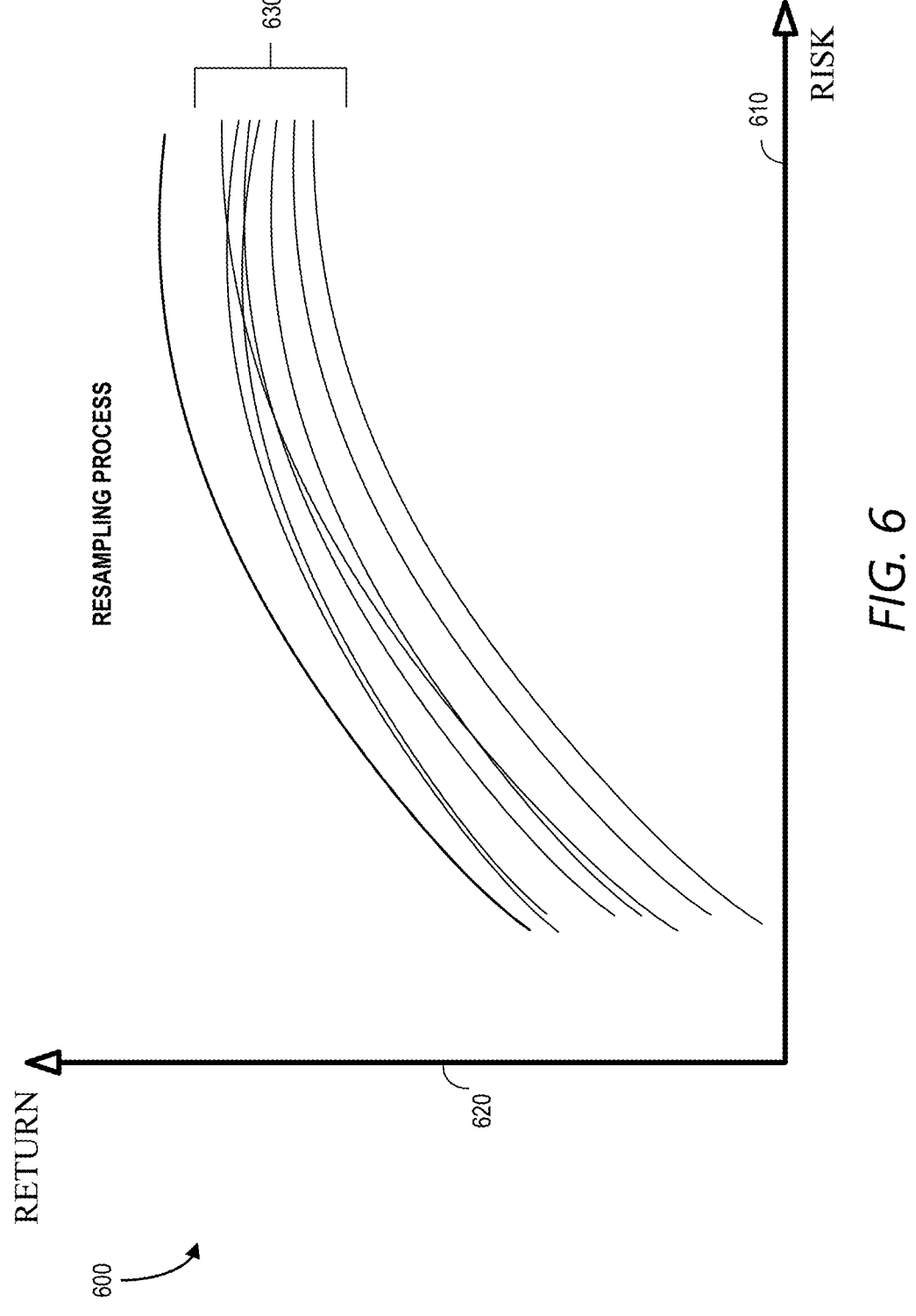
FIG. 6 shows a resampling process according to some embodiments.
Figure 7:
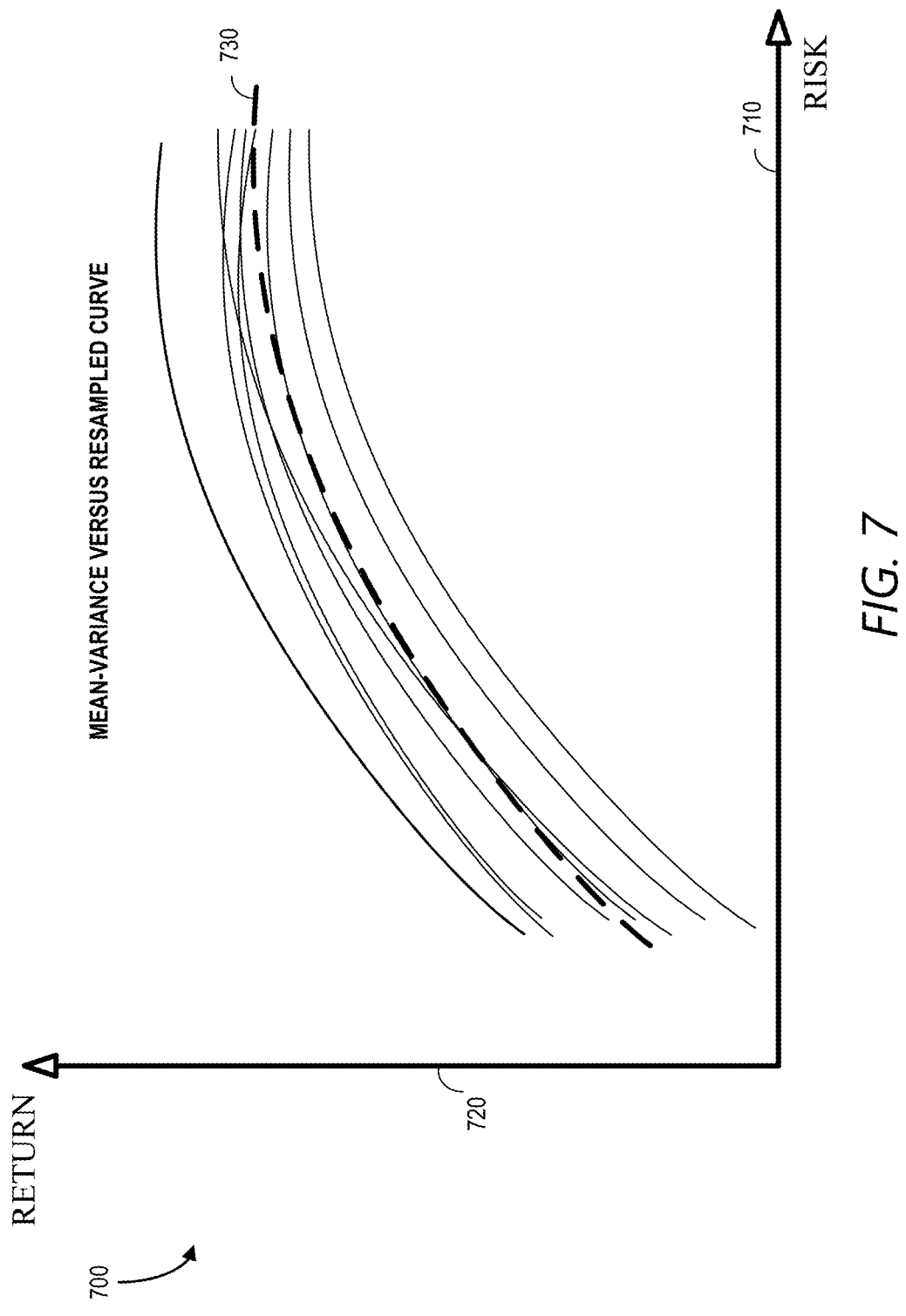
FIG. 7 shows a mean-variance resampled curve in accordance with some embodiments.

The resulting allocations are then averaged to generate a diversified model portfolio that accounts for how history could have unfolded, not just how it was actually realized. Each point on the resampled efficient frontier is the average of that point through all resamples. For example, FIGS. 5 through 7 show how resampling has the potential to provide a more robust result by varying the optimization inputs (as shown, for example, in FIGS. 8A through 8F). In this case, the risk and return assumptions used to create the initial frontier are too precise, and the new frontier provides a more realistic risk-reward tradeoff. The process can also help mitigate the issues of under-diversification and model sensitivity, since small differences in expected returns do not produce the correspondingly large effects apparent in the original frontier's results.

The resampled efficient frontier shows the relationship between the expected return and the expected risk of portfolios that lie within the client's constraints. Portfolios are reviewed to understand how they would have performed through historical stress periods. This is important because, during times of stress, historical investment returns are oftentimes negatively skewed, which can lead to greater losses than anticipated. A final solution is then selected on the frontier, based on the client's risk tolerance. It is also possible to optimize for minimum required capital and maximum net investment income, which is useful in understanding the different levers a client can pull when seeking to achieve objectives.

FIG. 5 shows 500 a traditional mean-variance curve in accordance with some embodiments. A graph shows risk 510 and return 520 and a curve 530 is constructed using mean-variance optimization. Note that a single optimization result is often under-diversified and sensitive to small changes in assumptions. FIG. 6 shows 600 a resampling process according to some embodiments. A graph again shows risk 610 and return 620 and the system is resampled 630 multiple times. Assumptions, such as return distribution or confidence intervals, are varied to account for the uncertainty of the sample estimates. FIG. 7 shows 700 a mean-variance resampled curve 730 (illustrated as a dashed line in FIG. 7) on a risk 710 versus return 720 graph in accordance with some embodiments. The new curve 730 is constructed by averaging the resampled frontiers. This curve 730 is built on more realistic assumptions and is better diversified as compared to the original curve 530 of FIG. 5 (as shown, for example, in FIGS. 8A through 8F).

Figure 8B:
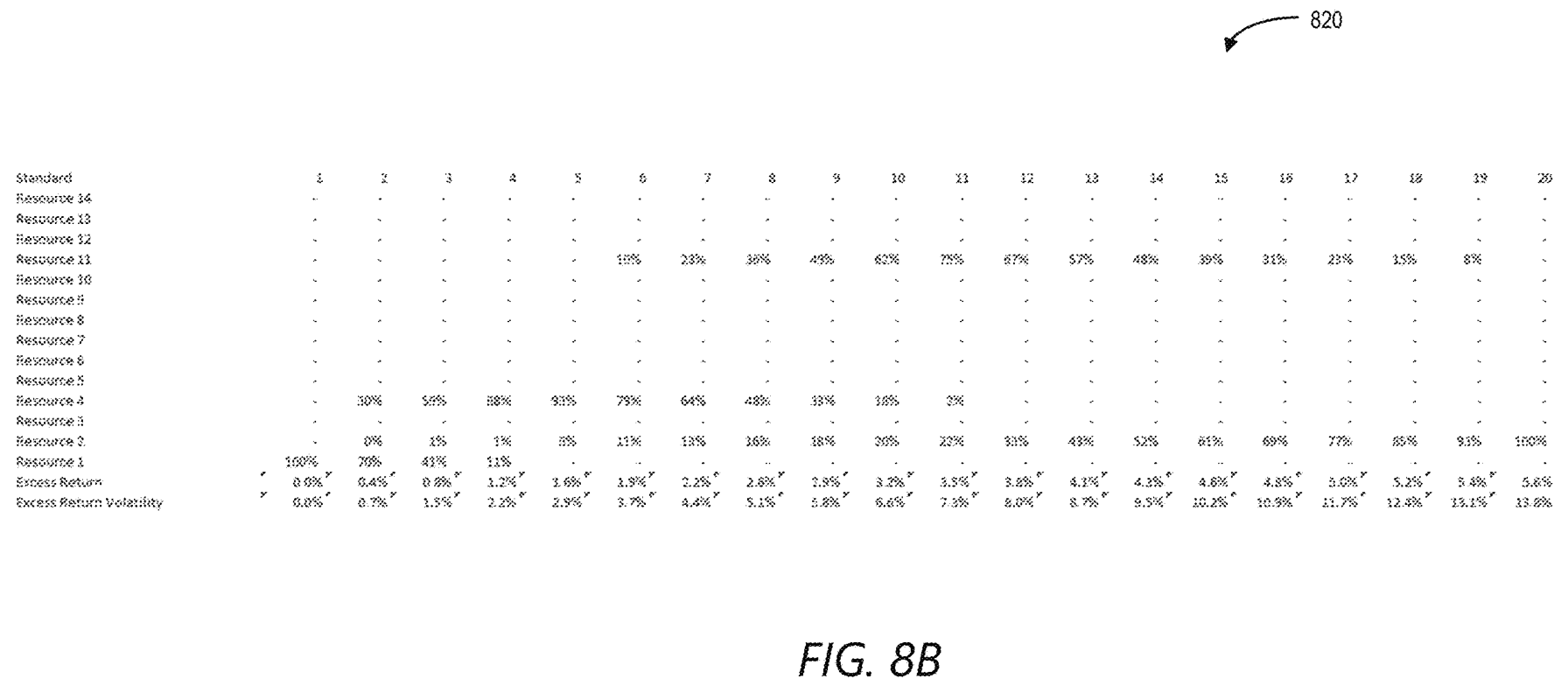
Figure 8C:
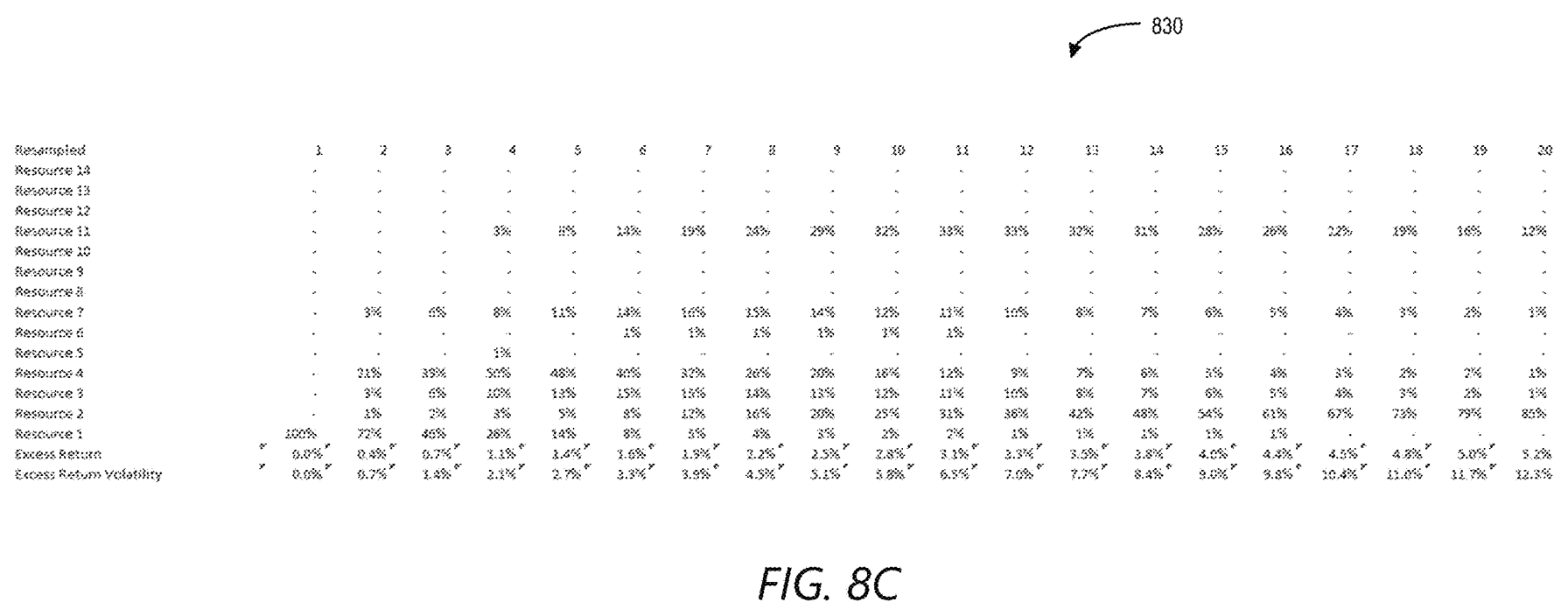
Figure 8D:
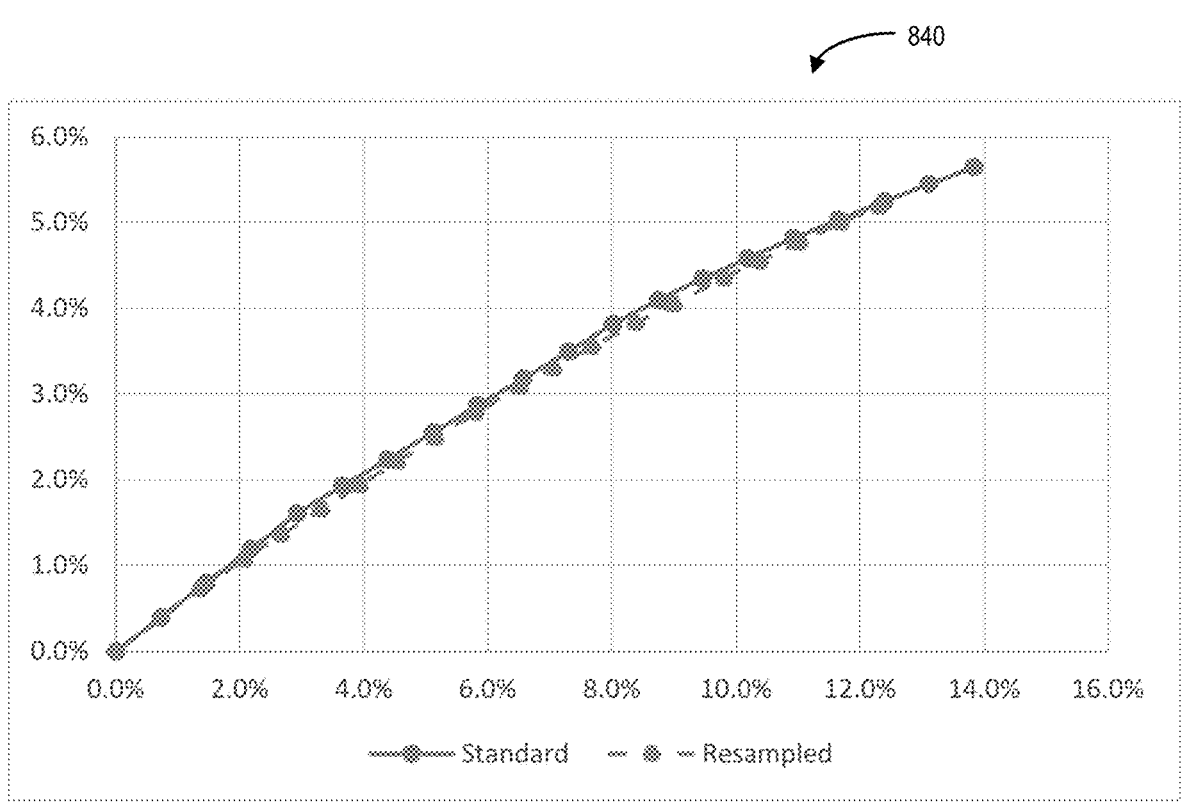
Figure 8E:
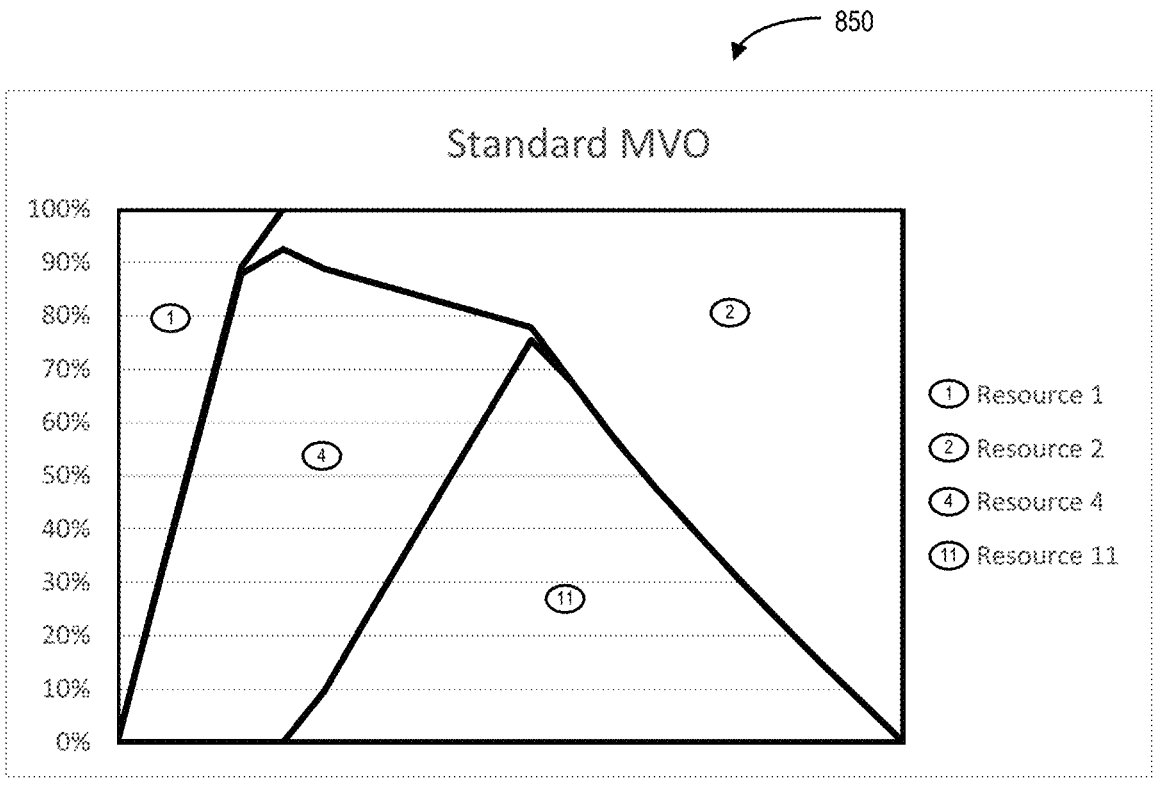
Figure 8F:
Figure 8F:
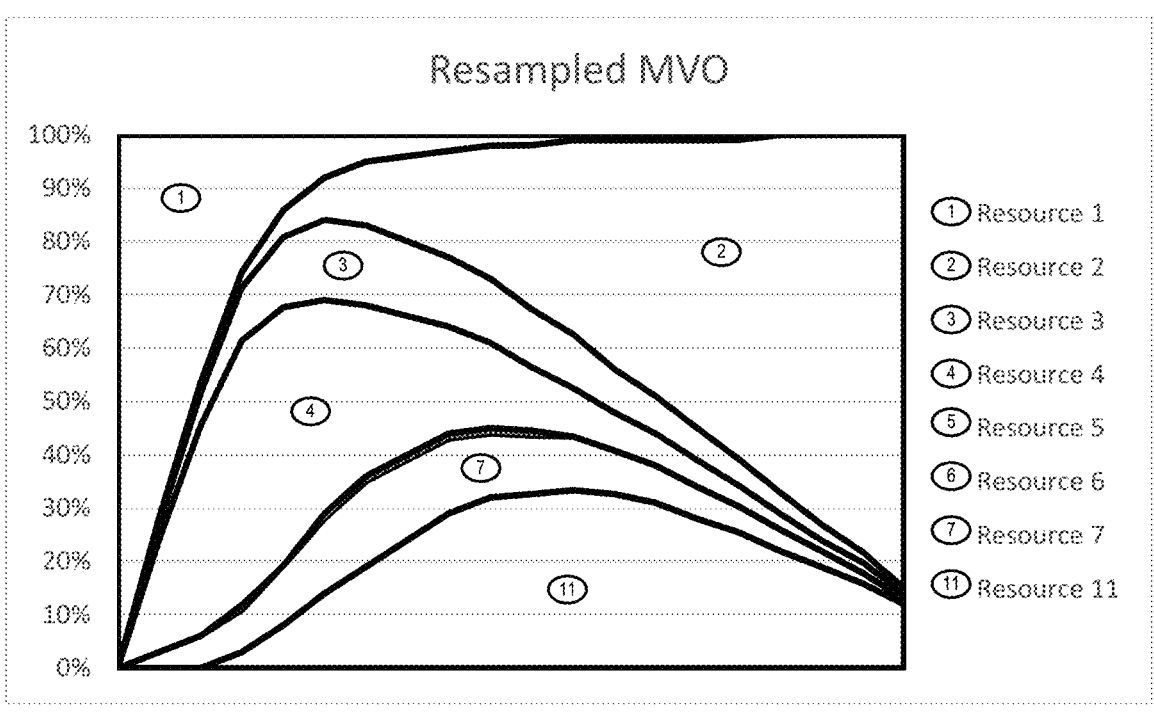

FIGS. 8A through 8F provide an example of how resampling can improve results in accordance with some embodiments. In particular, FIG. 8A is a chart 810 providing resource parameters for various asset classes. FIG. 8B is a chart 820 showing standard values for various resources ("Resource 1" through "Resource 14"), and FIG. 8C is a chart 830 showing resampled values for those resources. FIG. 8D is a graph 840 shows risk (X-axis) versus return (Y-axis) for the standard values (solid line) and resampled values (dashed line). FIG. 8E is a graph 840 that shows a standard Mean-Variance Optimization ("MVO"), and FIG. 8F is a graph 850 that shows a resampled MVO. Note that in a comparison of FIG. 8C (resampled) versus FIG. 8B (not resampled), the diversification across the difference resources increases. For example, at point 10 in the middle of the curve, the optimization allocates to only three asset classes in FIG. 8B. In contrast, the comparable point in FIG. 8C might allocate to seven different resources, while achieving comparable return and volatility. FIGS. 8E and 8F reinforce this benefit of resampling graphically.

Note that there are two algorithms that can be used for optimizing portfolios. A quadratic algorithm will find the closed-form solution as long as all constraints are linear. When the system includes constraints that are non-linear, there is no mathematical way to find the optimal solution. In these situations, a differential evolution algorithm may be used to approximate the optimal solution. The computational intensity of the evolutionary algorithm increases processing time. Thus, quadratic optimization is favored unless non-linear constraints are necessary, and the portfolio is at a significant enough unrealized gain or loss position that linear approximations are unable to generate adequate solutions.

Asset allocation model results can be utilized in multiple ways. A common use is generating a long-term neutral risk position as part of an investment policy statement, which acts as a formal representation of the strategic asset allocation. This agreed-upon benchmark helps clarify objectives and guide investment decisions made on a client's behalf. With the benchmark in place, security selection performance within asset classes can be evaluated.

The asset allocation model is also useful in tactical positioning. Portfolio managers are often required to make top-level decisions to allocate over short-term timeframes. The model supports the portfolio management function by organizing the multitude of inputs that need to be incorporated into investment decisions. A primary input to tactical asset allocation is short-term return forecasts, which can be influenced by the current level of spreads, expected changes in spreads, macroeconomic developments, and evolving views on default and migration risks.

Consider an insurance company that completes an acquisition of a new business, which leads to the assumption of new assets under management. The portfolio manager works with the client to understand the incoming portfolio and ascertain objectives and constraints. The asset allocation team can add value by dimensioning the current portfolio and identifying opportunities when seeking to better align the strategy with investment objectives.

In this example, the current portfolio does not satisfy the income objectives of the new company, while an outsized allocation to preferred equity contributes too much risk. By building portfolio optimizations that incorporate income needs, capital constraints, and economic opportunities, the asset allocation team may be able to help create a portfolio that has the potential to enhance income while reducing concentration risk. The solution reduces public and preferred equities in favor of high yield corporate bonds, reduces municipal bonds in favor of investment grade corporate bonds, and selectively pursues opportunities in illiquid asset classes such as corporate private placements and commercial mortgage loans.

As another example, consider client who is changing objectives to be less focused on net investment income and more on statutory capital. In order to fund the current liabilities, the investment manager needs to identify the appropriate amount of capital to hold and determine which asset classes to invest in. The asset allocation team determines that when the allocation to high-quality structured products and commercial mortgage loans is increased, the expected return and risk profile of the portfolio can be maintained while reducing the required capital.

Figure 9:
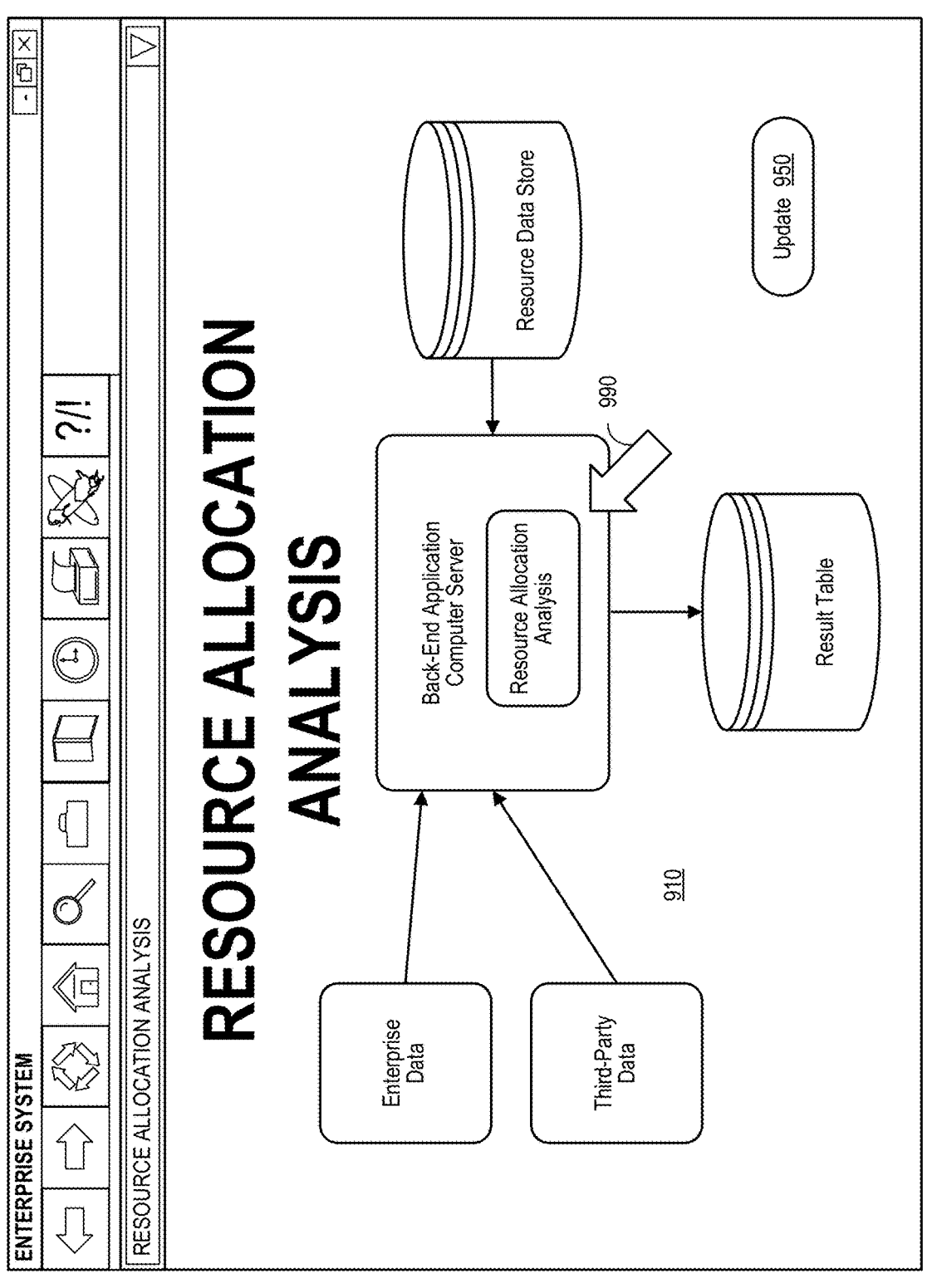
FIG. 9 is a resource allocation analysis display according to some embodiments.

The data analyzed by the system may be presented on a Graphical User Interface ("GUI"). For example, FIG. 9 is a resource allocation analysis display 900 including graphical representations of elements of an analysis system 910 according to some embodiments. Selection of a portion or element of the display 900 might result in the presentation of additional information about that portion or element (e.g., a popup window presenting a data source or result table) or let an operator or administrator enter or annotate additional information about resource allocations (e.g., based on his or her experience and expertise). Selection of an "Update" icon 950 (e.g., by touchscreen or computer mouse pointer 990) might cause the system or platform to re-analyze a portfolio.

Figure 10:
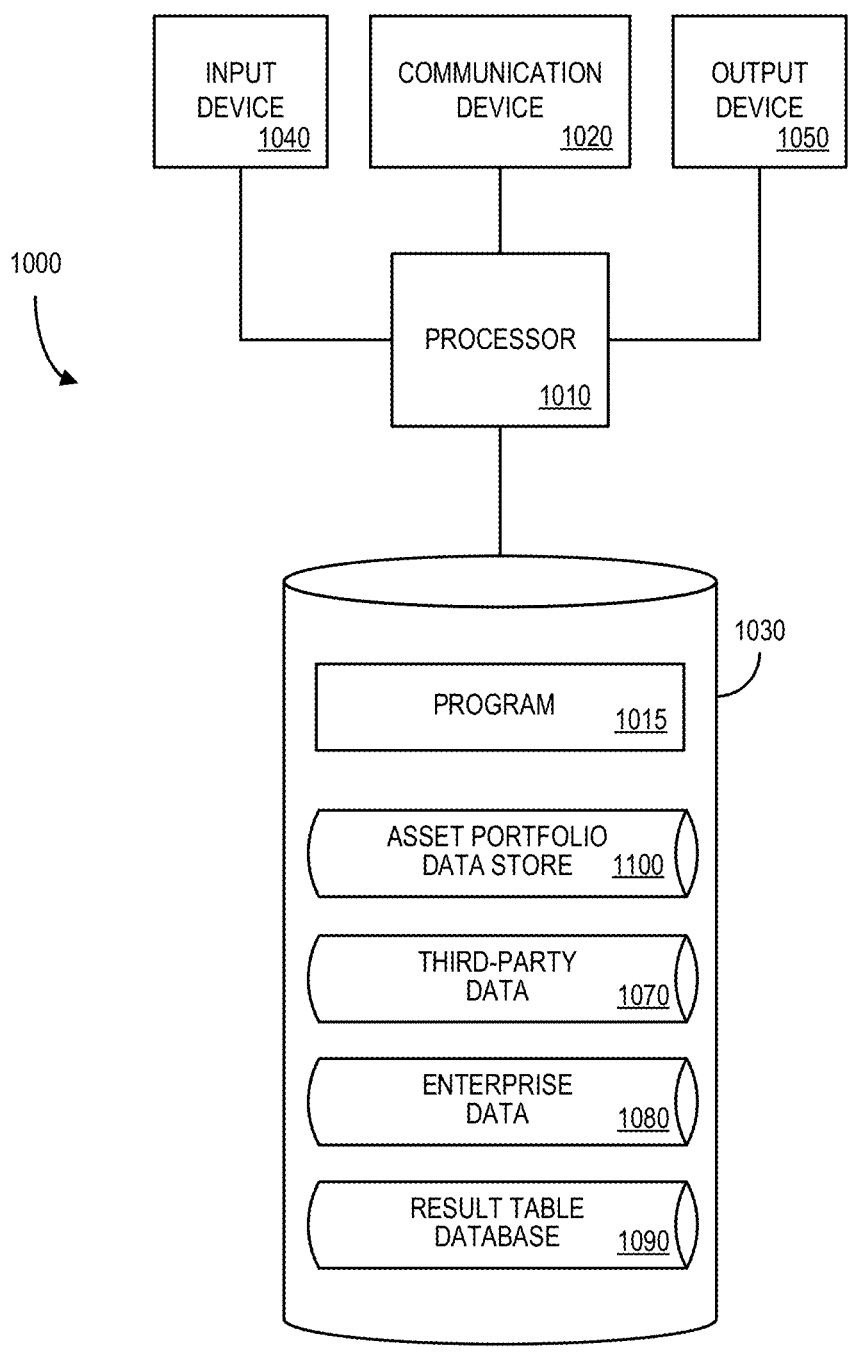
FIG. 10 is a block diagram of an apparatus in accordance with some embodiments of the present invention.

The embodiments described herein may be implemented using any number of different hardware configurations. For example, FIG. 10 illustrates an apparatus 1000 that may be, for example, associated with the system 100 described with respect to FIG. 1. The apparatus 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote third-party business or economic platforms, administrator computers, and/or communication devices (e.g., PCs and smartphones). Note that communications exchanged via the communication device 1020 may utilize security features, such as those between a public internet user and an internal network of an insurance company and/or an enterprise. The security features might be associated with, for example, web servers, firewalls, and/or PCI infrastructure. The apparatus 1000 further includes an input device 1040 (e.g., a mouse and/or keyboard to enter information about data sources, optimization parameters, third-parties, etc.) and an output device 1050 (e.g., to output reports regarding analysis results, recommended changes, alerts, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or an asset allocation analysis tool or application for controlling the processor 1010. The processor 1010 performs instructions of the program 1015, and thereby operates in accordance with any of the embodiments described herein. For example, the processor 1010 may execute a differential evolutionary algorithm to optimize a set of resource types based on at least one non-linear constraint and generate resource analysis results. The processor 1010 may, according to some embodiments, perform a resampling process that uses non-parameterized historical data, regression on at least one resource type, and moment matching.

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the apparatus 1000 from another device; or (ii) a software application or module within the apparatus 1000 from another software application, module, or any other source.

In some embodiments (such as shown in FIG. 10), the storage device 930 further stores an asset portfolio data store 1100 (e.g., defining characteristics of the portfolio), third-party data 1070 (e.g., with third-party business or economic data), enterprise data 1080 (e.g., regarding asset allocations, characteristics, constraints, etc.), and a result table database 1090. An example of database that might be used in connection with the apparatus 1000 will now be described in detail with respect to FIG. 11. Note that the database described herein is only an example, and additional and/or different information may be stored therein. Moreover, various databases might be split or combined in accordance with any of the embodiments described herein. For example, the result table database 1090 might be combined and/or linked to each other within the program 1015.

Referring to FIG. 11, a table is shown that represents the asset portfolio data store 1000 that may be stored at the apparatus 1000 according to some embodiments. The table may include, for example, entries associated with assets owned by an enterprise. The table may also define fields 1102, 1104, 1106, 1108, 1110 for each of the entries. The fields 1102, 1104, 1106, 1108, 1110 may, according to some embodiments, specify: a portfolio identifier 1102, an asset class 1104, a risk/return 1106, an income 1108, and a tax benefit 1110. The asset portfolio data store 1100 may be created and updated, for example, based on information electrically received from various operators, administrators, and computer systems (e.g., including when a new portfolio is obtained or analyzed) that may be associated with an insurer.

The portfolio identifier 1102 may be, for example, a unique alphanumeric code identifying a set or resources or assets to be analyzed. The asset class 1104 may describe the asset. The asset portfolio data store 1100 may include various resource parameters for the asset class 1104, such as the risk/return 1106, the income 1108, the tax benefit 1110, etc.

Thus, embodiments may provide an automated and efficient way to analyze a set of resources even when some optimization constraints are non-linear. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of enterprises in additional to and/or instead of those described herein. Similarly, although certain asset classes and parameters were described in connection some embodiments herein, other types of asset classes and parameters might be used instead.

Figure 12:
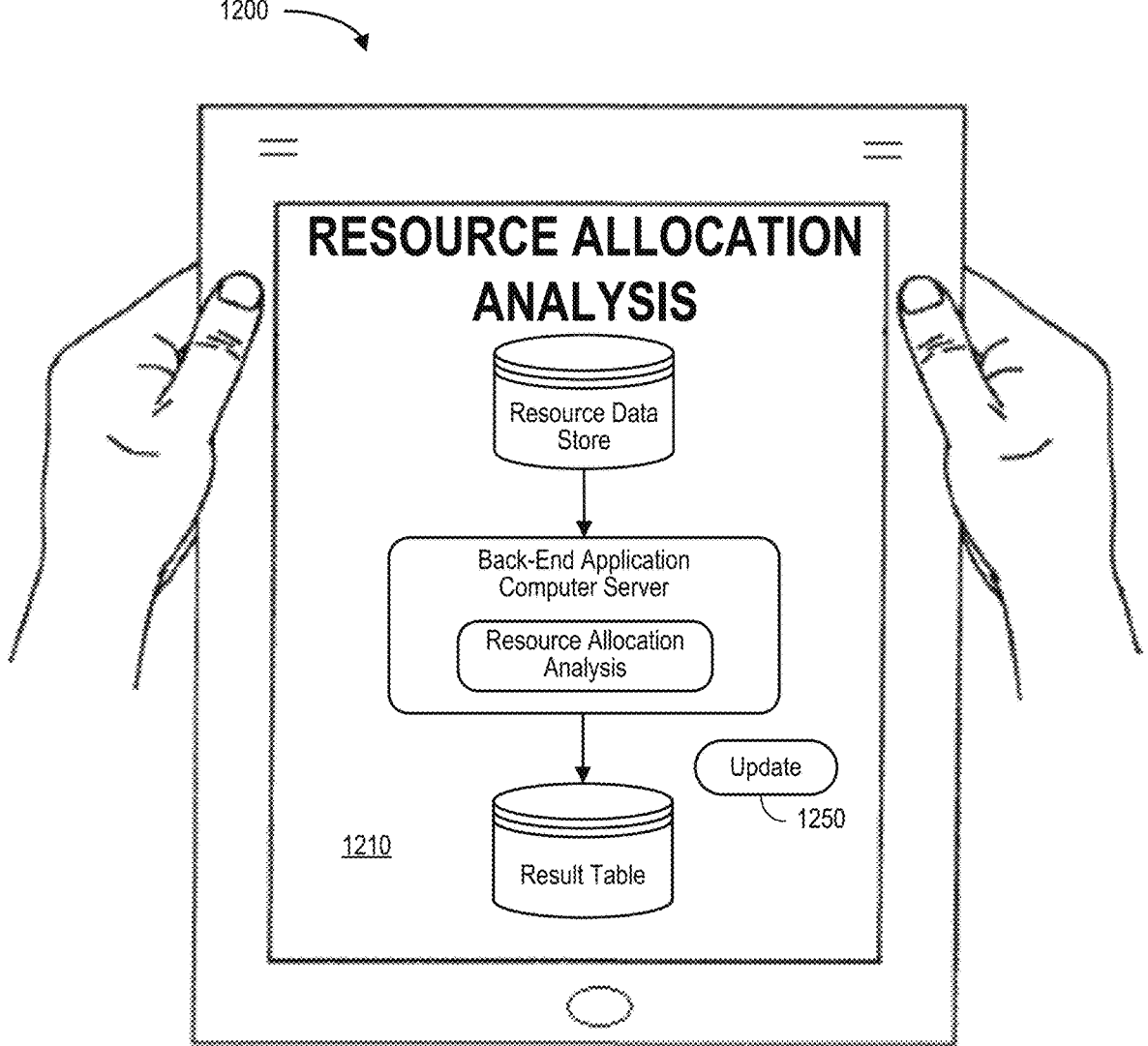
FIG. 12 illustrates a tablet computer with resource allocation analysis display according to some embodiments.

Note that the displays and devices illustrated herein are only provided as examples, and embodiments may be associated with any other types of user interfaces. For example, FIG. 12 illustrates a tablet computer 1200 with a resource allocation analysis display 1210 according to some embodiments. The resource allocation analysis display 1210 shows elements of a portfolio analysis system that might include selectable data that can be modified by a user of the handheld computer 1200 (e.g., via an "Update" icon 1250) to view updated resource allocation analysis result data associated with an enterprise (e.g., including, in some embodiments, optimized allocations).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A resource allocation analysis system implemented via a back-end application computer server, comprising:

(a) a resource data store associated with an encrypted database management system and containing electronic records associated with a set of resource types, each electronic record including an electronic record identifier and resource parameter;

(b) the back-end application computer server, coupled to the resource data store, including:

a computer processor, and a computer memory, coupled to the computer processor, storing instructions that, when executed by the computer processor cause the back-end application computer server to:

(i) receive, from the resource data store, information about a set of resource types to be analyzed, including the associated resource parameters, (ii) if a constraint type is non-linear:

execute a differential evolutionary algorithm to optimize the set of resource types based on at least one non-linear constraint associated with net investment income and generate resource analysis results, wherein the differential evolutionary algorithm is a model-based metaheuristic optimization algorithm, and (iii) if a constraint type is linear:

execute a quadratic algorithm, instead of the differential evolutionary algorithm, to optimize the set of resource types based on the linear constraint and generate resource analysis results, thereby reducing an exchange of information associated with the back-end application computer server as compared to execution of the differential evolutionary algorithm, wherein the back-end application computer server performs a resampling process that uses non-parameterized historical data, regression on at least one resource type, and moment matching based on skew; and (c) a communication port coupled to the back-end application computer server to transmit data to a remote output device to generate a report, including the resource analysis results, via at least one security feature component and a distributed communication network.

2. The system of claim 1, wherein the resampling process comprises:

constructing a risk-return curve using mean-variance optimization;

executing resamples with varied return distribution or confidence intervals; and constructing a new risk-return curve by averaging the resampled results.

3. The system of claim 1, wherein the moment matching is associated with at least one of: (i) mean, (ii) volatility, and (iii) a distribution shape.

4. The system of claim 1, wherein the resource types comprise asset types of an insurer and the set of resource types comprises an asset portfolio.

5. The system of claim 4, wherein the asset types include at least one of: (i) stocks, (ii) bonds, (iii) hedge fund assets, (iv) high yield corporate assets, (v) emerging market assets, (vi) tax-exempt municipal assets, (vii) private equity, (viii) governmental treasury assets, and (ix) cash.

6. The system of claim 4, wherein the at least one non-linear constraint is associated with: (i) capital consumption, (ii) asset turnover, (iii) book yield, and (iv) realized capital gains.

7. The system of claim 4, wherein the differential evolution algorithm further optimizes expected return.

8. A computerized resource allocation analysis method implemented via a back-end application computer server, comprising:

receiving, by the back-end application computer server from a resource data store, information about a set of resource types to be analyzed, including associated resource parameters, wherein the resource data store is associated with an encrypted database management system and contains electronic records associated with a set of resource types, each electronic record including an electronic record identifier and resource parameter;

if a constraint type is non-linear:

executing a differential evolutionary algorithm to optimize the set of resource types based on the at least one non-linear constraint associated with net investment income and generate resource analysis results, wherein the differential evolution algorithm comprises a model-based metaheuristic optimization algorithm;

if a constraint type is linear:

executing a quadratic algorithm, instead of the differential evolutionary algorithm, to optimize the set of resource types based on the linear constraint and generate resource analysis results, thereby reducing an exchange of information associated with the back-end application computer server as compared to execution of the differential evolutionary algorithm, wherein the back-end application computer server performs a resampling process that uses non-parameterized historical data, regression on at least one resource type, and moment matching based on skew; and transmitting, via a communication port coupled to the back-end application computer server, data to a remote output device to generate a report, including the resource analysis results, via at least one security feature component and a distributed communication network.

9. The method of claim 8, wherein the set of resource types are optimized based on at least one non-linear constraint and the differential evolutionary algorithm is executed.

10. The method of claim 9, wherein the resampling process comprises:

constructing a risk-return curve using mean-variance optimization;

executing resamples with varied return distribution or confidence intervals; and constructing a new risk-return curve by averaging the resampled results.

11. The method of claim 9, wherein the moment matching is further associated with at least one of: (i) mean, (ii) volatility, and (iii) a distribution shape.

12. The method of claim 9, wherein the resource types comprise asset types of an insurer and the set of resource types comprises an asset portfolio.

13. The method of claim 12, wherein the asset types include at least one of: (i) stocks, (ii) bonds, (iii) hedge fund assets, (iv) high yield corporate assets, (v) emerging market assets, (vi) tax-exempt municipal assets, (vii) private equity, (viii) governmental treasury assets, and (ix) cash.

14. The method of claim 12, wherein the at least one non-linear constraint is associated with: (i) capital consumption, (ii) asset turnover, (iii) book yield, and (iv) realized capital gains.

15. The method of claim 12, wherein the differential evolution algorithm further optimizes expected return.

16. A non-transitory, computer-readable medium storing instructions, that, when executed by a processor, cause the processor to perform a resource allocation analysis method implemented via a back-end application computer server, the method comprising:

receiving, by the back-end application computer server from a resource data store, information about a set of resource types to be analyzed, including associated resource parameters, wherein the resource data store is associated with an encrypted database management system and contains electronic records associated with a set of resource types, each electronic record including an electronic record identifier and resource parameter;

if a constraint type is non-linear:

executing a differential evolutionary algorithm to optimize the set of resource types based on at least one non-linear constraint associated with net investment income and generate resource analysis results, wherein the differential evolution algorithm comprises a model-based metaheuristic optimization algorithm;

if a constraint type is linear:

executing a quadratic algorithm, instead of the differential evolutionary algorithm, to optimize the set of resource types based on the linear constraint and generate resource analysis results, thereby reducing an exchange of information associated with the back-end application computer server as compared to execution of the differential evolutionary algorithm, wherein the back-end application computer server performs a resampling process that uses non-parameterized historical data, regression on at least one resource type, and moment matching based on skew; and transmitting, via a communication port coupled to the back-end application computer server, to a remote output device to generate a report, including the resource analysis results, via at least one security feature component and a distributed communication network.

17. The medium of claim 16, wherein the resampling process comprises:

constructing a risk-return curve using mean-variance optimization;

executing resamples with varied return distribution or confidence intervals; and constructing a new risk-return curve by averaging the resampled results.

18. The medium of claim 16, wherein the moment matching is associated with at least one of: (i) mean, (ii) volatility, and (iii) a distribution shape.

19. The medium of claim 16, wherein the resource types comprise asset types of an insurer and the set of resource types comprises an asset portfolio.

20. The medium of claim 19, wherein the asset types include at least one of: (i) stocks, (ii) bonds, (iii) hedge fund assets, (iv) high yield corporate assets, (v) emerging market assets, (vi) tax-exempt municipal assets, (vii) private equity, (viii) governmental treasury assets, and (ix) cash.

21. The medium of claim 19, wherein the at least one non-linear constraint is associated with: (i) capital consumption, (ii) asset turnover, (iii) book yield, and (iv) realized capital gains.

22. The medium of claim 19, wherein the differential evolution algorithm further optimizes expected return.

* * * * *